(12) United States Patent
Yoshida et al.

(10) Patent No.: US 9,459,820 B2
(45) Date of Patent: Oct. 4, 2016

(54) DISPLAY PROCESSING APPARATUS, DISPLAY PROCESSING METHOD, AND COMPUTER PROGRAM PRODUCT

(71) Applicants: Hiroyuki Yoshida, Tokyo (JP);
 Ryonosuke Miyazaki, Tokyo (JP);
 Yasushi Yamaguchi, Tokyo (JP);
 Tomoyoshi Takeuchi, Tokyo (JP)

(72) Inventors: Hiroyuki Yoshida, Tokyo (JP);
 Ryonosuke Miyazaki, Tokyo (JP);
 Yasushi Yamaguchi, Tokyo (JP);
 Tomoyoshi Takeuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 343 days.

(21) Appl. No.: 14/073,054

(22) Filed: Nov. 6, 2013

(65) Prior Publication Data

US 2014/0125659 A1 May 8, 2014

(30) Foreign Application Priority Data

Nov. 8, 2012 (JP) ................................. 2012-245977
Aug. 27, 2013 (JP) ................................. 2013-176089

(51) Int. Cl.
 *G06T 11/00* (2006.01)
 *G09G 5/10* (2006.01)
 (Continued)

(52) U.S. Cl.
 CPC .......... *G06F 3/1256* (2013.01); *G06F 3/1208* (2013.01); *G06F 3/1285* (2013.01);
 (Continued)

(58) Field of Classification Search
 CPC ............. G01J 2003/467; G01J 3/504; G01N 2021/4711; G01N 2021/575; G01N 21/251; G01N 21/4738; G01N 21/57; G06T 11/00; G06T 15/50; G06T 15/506; G06T 19/006; G06T 19/20; G06T 2215/16; G06T 2219/2012; G06T 3/60; G09G 2320/0666; G09G 2360/144; G09G 5/02; G09G 5/06; H04N 1/6011
 See application file for complete search history.

(56) References Cited

U.S. PATENT DOCUMENTS 6,567,543 B1 * 5/2003 Shiraiwa ............... H04N 1/6088
  348/E9.052
8,797,321 B1 * 8/2014 Bertolami ............... G06T 15/50
  345/426

(Continued)

FOREIGN PATENT DOCUMENTS

JP 2012-039480 2/2012
JP 2012-044421 3/2012

(Continued)

OTHER PUBLICATIONS

Frahm, Jan-Michael, et al. "Markerless augmented reality with light source estimation for direct illumination." Conference on Visual Media Production CVMP, London. 2005.*

*Primary Examiner* — Sultana M Zalalee
(74) *Attorney, Agent, or Firm* — Oblon, McClelland, Maier & Neustadt, L.L.P

(57) ABSTRACT

A first acquiring unit acquires a background image being an image of a usage environment in which a printed material is used, a lighting image of a lighting installed in the usage environment, and light source information indicating an optical attribute in the usage environment. A second acquiring unit acquires print data. A display control unit displays a preview image on a display unit, where the preview image is an image in which a printed material image is superimposed on the background image, and the printed material image is an image in which the lighting image is mapped by environment mapping onto a print-image display surface generated based on the print data and in which the optical attribute specified by the light source information is set.

10 Claims, 14 Drawing Sheets

| TEXTURE INFORMATION NAME | CORRECTION INFORMATION | | | | | | |
|---|---|---|---|---|---|---|---|
| | LIGHTING CONVERSION INFORMATION | | REFLECTION INFORMATION | | | | |
| | BLUR PARAMETER | GAMMA CORRECTION VALUE | SPECULAR REFLECTION | DIFFUSE REFLECTION | ENVIRONMENT REFLECTION | SELF-EMITTING LIGHT | SPECULAR EXPONENT |
| MIRROR COATED PAPER | (10, 10) | 1.2 | 4 | 10 | 9 | 1 | 100 |
| GLOSS PAPER | (50, 50) | 1.6 | 2 | 7 | 9 | 0 | 80 |
| MATTE PAPER | (100, 100) | 2.1 | 1 | 5 | 9 | 0 | 60 |
| ⋮ | ⋮ | ⋮ | ⋮ | ⋮ | ⋮ | ⋮ | ⋮ |

(51) Int. Cl.
  *G06F 3/12* (2006.01)
  *G06T 15/50* (2011.01)
  *G06T 19/20* (2011.01)
  *H04N 1/00* (2006.01)
  *H04N 1/60* (2006.01)
  *G06F 3/147* (2006.01)
  *G09G 3/00* (2006.01)

(52) U.S. Cl.
  CPC ........... *G06T11/001* (2013.01); *G06T 15/506* (2013.01); *G06T 19/20* (2013.01); *G09G 5/10* (2013.01); *H04N 1/00442* (2013.01); *H04N 1/6086* (2013.01); *G06F 3/147* (2013.01); *G06T 2215/16* (2013.01); *G09G 3/002* (2013.01); *G09G 3/003* (2013.01); *G09G 2340/10* (2013.01); *G09G 2340/12* (2013.01)

(56) References Cited

U.S. PATENT DOCUMENTS

| | | | |
|---|---|---|---|
| 2011/0304863 A1* | 12/2011 | Shibuya | H04N 1/6097 358/1.9 |
| 2012/0032973 A1 | 2/2012 | Sano | |
| 2012/0218574 A1* | 8/2012 | Fukuda | H04N 1/6097 358/1.9 |
| 2012/0257258 A1* | 10/2012 | Sasaki | G06F 3/1214 358/3.24 |
| 2012/0307005 A1* | 12/2012 | Guzman Suarez | G06T 11/00 348/43 |

FOREIGN PATENT DOCUMENTS

| | | |
|---|---|---|
| JP | 4960840 | 3/2012 |
| JP | 2014-095965 | 5/2014 |

\* cited by examiner

FIG.3

| TEXTURE INFORMATION NAME | CORRECTION INFORMATION | | | | | | |
|---|---|---|---|---|---|---|---|
| | LIGHTING CONVERSION INFORMATION | | REFLECTION INFORMATION | | | | |
| | BLUR PARAMETER | GAMMA CORRECTION VALUE | SPECULAR REFLECTION | DIFFUSE REFLECTION | ENVIRONMENT REFLECTION | SELF-EMITTING LIGHT | SPECULAR EXPONENT |
| MIRROR COATED PAPER | (10, 10) | 1.2 | 4 | 10 | 9 | 1 | 100 |
| GLOSS PAPER | (50, 50) | 1.6 | 2 | 7 | 9 | 0 | 80 |
| MATTE PAPER | (100, 100) | 2.1 | 1 | 5 | 9 | 0 | 60 |
| ⋮ | ⋮ | ⋮ | ⋮ | ⋮ | ⋮ | ⋮ | ⋮ |

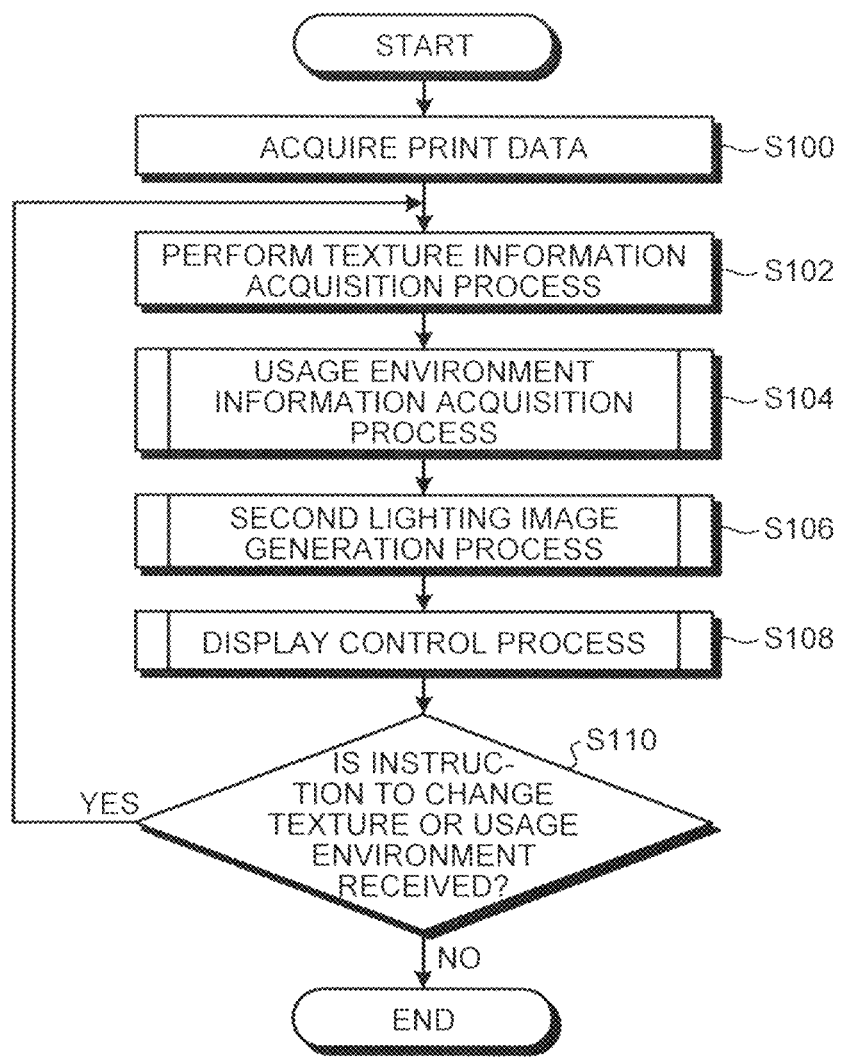

FIG.5

| USAGE ENVIRONMENT NAME | BACKGROUND IMAGE | FIRST LIGHTING IMAGE | LIGHT SOURCE INFORMATION NAME |
|---|---|---|---|
| OFFICE | OFFICE BACKGROUND.bmp | OFFICE LIGHT SOURCE.bmp | OFFICE |
| EXHIBITION HALL | EXHIBITION HALL BACKGROUND.bmp | EXHIBITION HALL LIGHT SOURCE.bmp | EXHIBITION HALL |
| STATION PLATFORM | STATION PLATFORM BACKGROUND.bmp | STATION PLATFORM LIGHT SOURCE.bmp | STATION PLATFORM |
| STUDY | STUDY BACKGROUND.bmp | STUDY LIGHT SOURCE.bmp | STUDY |
| OUTSIDE 1 | OUTSIDE 1 BACKGROUND.bmp | OUTSIDE 1 LIGHT SOURCE.bmp | OUTSIDE 1 |
| ⋮ | ⋮ | ⋮ | ⋮ |

FIG.6

| LIGHT SOURCE INFORMATION NAME | LIGHT SOURCE INFORMATION | | | | | |
|---|---|---|---|---|---|---|
| | LIGHT SOURCE TYPE | SPECULAR LIGHT | DIFFUSE LIGHT | ENVIRONMENT LIGHT | COLOR TEMPERATURE | POSITION OF LIGHT SOURCE XYZ |
| OFFICE | 1 | 0 | 6 | 9 | 5000 | (0,40,20) |
| EXHIBITION HALL | 1 | 0 | 6 | 8 | 4200 | (0,20,10) |
| STATION PLATFORM | 1 | 0 | 6 | 5 | 6500 | (0,10,30) |
| STUDY | 1 | 0 | 8 | 7 | 3500 | (0,0,5) |
| OUTSIDE 1 | 0 | 10 | 8 | 8 | 5000 | (0,20,10) |
| ⋮ | ⋮ | ⋮ | ⋮ | ⋮ | ⋮ | ⋮ |

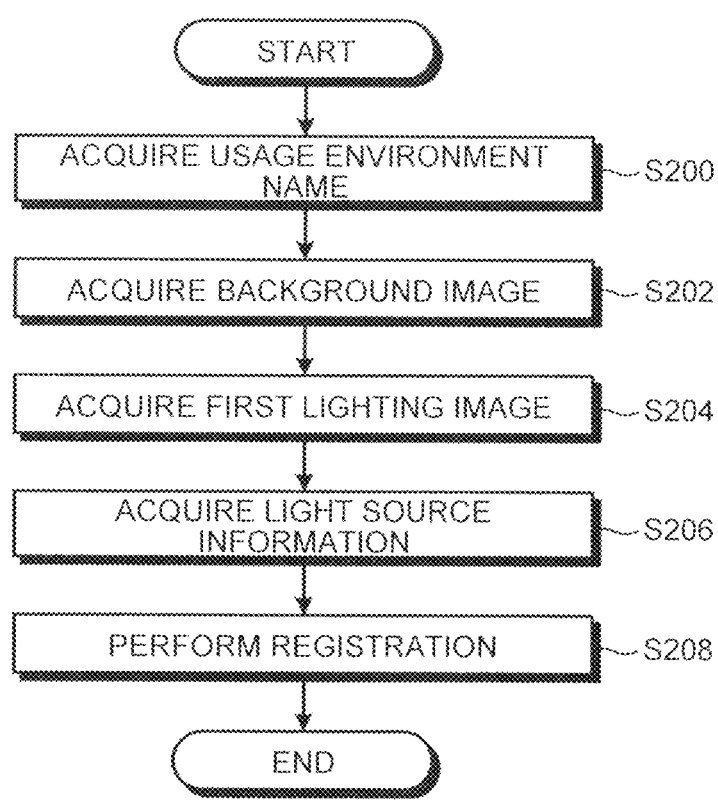

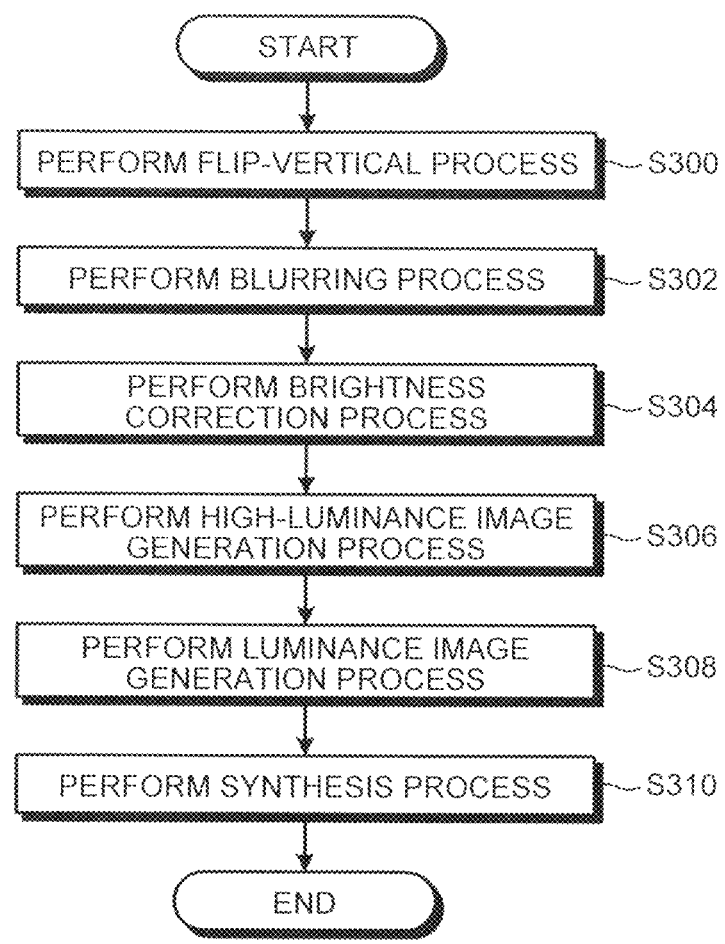

DISPLAY PROCESSING APPARATUS, DISPLAY PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-245977 filed in Japan on Nov. 8, 2012 and Japanese Patent Application No. 2013-176089 filed in Japan on Aug. 27, 2013.

BACKGROUND OF THE INVENTION

1. Field of the Invention

The present invention relates to a display processing apparatus, a display processing method, and a computer program product.

2. Description of the Related Art

An apparatus that displays a preview image for enabling to check a print result of print data before printing has been known (see, for example, Japanese Laid-open Patent Publication No. 2009-130461 and Japanese Laid-open Patent Publication No. 2012-44421).

Japanese Laid-open Patent Publication No. 2009-130461 discloses a technology for generating a preview image by using a grayscale image of a recording medium corresponding to one set of parameters selected from among multiple sets of parameters that are set in advance. Furthermore, Japanese Laid-open Patent Publication No. 2012-44421 discloses a technology for displaying a preview image, in which reflection of an observation lighting appears, when an image of a printed material under the observation lighting is reproduced on a monitor. Specifically, in the technology disclosed in Japanese Laid-open Patent Publication No. 2012-44421, a piece of lighting image data that is selected based on installation information on the observation lighting from among pieces of lighting image data prepared in advance is processed based on goniophotometric reflection properties of a recording medium in order to generate a blurred image, and the generated blurred image and a proof target image are synthesized and then displayed as a preview image.

A printed material that is actually output as a print result is used in various environments, such as a station platform, an exhibition hall, an office, or a study. Furthermore, user's impression of the printed material upon actually viewing it may differ depending on the atmosphere of an environment of a real space in which the printed material is used (hereinafter, the environment is referred to as a usage environment). For example, even the same printed material gives different impressions in different situations, such as when the printed material is hung from the ceiling of an exhibition hall and when the printed material is mounted on the wall of a study. However, in the conventional apparatus for displaying the preview image, it is difficult to provide a preview image that enables to check a print result of print data together with an atmosphere of a usage environment.

Therefore, there is a need to provide a display processing apparatus, a display processing method, and a computer program product capable of providing a preview image that enables to check a print result of print data together with an atmosphere of a usage environment.

SUMMARY OF THE INVENTION

It is an object of the present invention to at least partially solve the problems in the conventional technology.

According to the present invention, there is provided: a display processing apparatus comprising: a first acquiring unit configured to acquire a background image being an image of a usage environment in which a printed material is used, a lighting image being an image of a lighting installed in the usage environment, and light source information indicating an optical attribute in the usage environment; a second acquiring unit configured to acquire print data; and a display control unit configured to display a preview image on a display unit, the preview image being an image in which a printed material image is superimposed on the background image, and the printed material image being an image in which the lighting image is mapped by environment mapping onto a print-image display surface generated based on the print data and in which the optical attribute specified by the light source information is set.

The present invention also provides a display processing method implemented by a display processing apparatus, the display processing method comprising: first acquiring including acquiring, by the display processing apparatus, a background image being an image of a usage environment in which a printed material is used, a lighting image being an image of a lighting installed in the usage environment, and light source information indicating an optical attribute in the usage environment; second acquiring including acquiring, by the display processing apparatus, print data; and displaying, by the display processing apparatus, a preview image on a display unit, the preview image being an image in which a printed material image is superimposed on the background image, and the printed material image being an image in which the lighting image is mapped by environment mapping onto a print-image display surface generated based on the print data and in which the optical attribute specified by the light source information is set.

The present invention also provides a computer program product comprising a non-transitory computer-usable medium having computer-readable program codes embodied in the medium, the program codes when executed causing a computer to execute: acquiring a background image being an image of a usage environment in which a printed material is used, a lighting image being an image of a lighting installed in the usage environment, and light source information indicating an optical attribute in the usage environment; acquiring print data; and displaying a preview image on a display unit, the preview image being an image in which a printed material image is superimposed on the background image, and the printed material image being an image in which the lighting image is mapped by environment mapping onto a print-image display surface generated based on the print data and in which the optical attribute specified by the light source information is set.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram illustrating an example of a data structure of a texture information table;

FIG. 4 is a flowchart illustrating the flow of a display process;

FIG. 5 is a schematic diagram illustrating an example of a data structure of a usage environment table;

FIG. 6 is a schematic diagram illustrating an example of a data structure of a light source information table;

FIG. 7 is a flowchart illustrating the flow of a registration process;

FIG. 8 is a flowchart illustrating the flow of a second lighting image generation process;

DETAILED DESCRIPTION OF THE PREFERRED EMBODIMENTS

Exemplary embodiments of a display processing apparatus, a display processing method, and a computer program product according to the present invention will be explained in detail below with reference to the accompanying drawings.

Figure 1:
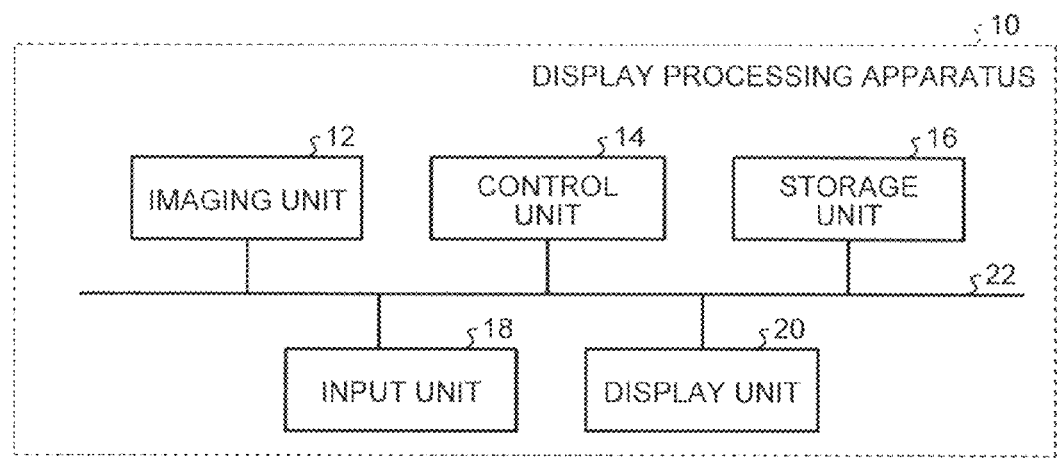
FIG. 1 is a block diagram illustrating an overall configuration of a display processing apparatus.

FIG. 1 is a block diagram illustrating an overall configuration of a display processing apparatus 10 according to an embodiment. The display processing apparatus 10 generates a preview image for checking a print result of print data and displays the preview image. The display processing apparatus 10 may be a portable mobile terminal or a fixed terminal.

The display processing apparatus 10 includes an imaging unit 12, a control unit 14, a storage unit 16, an input unit 18, and a display unit 20. The imaging unit 12, the control unit 14, the storage unit 16, the input unit 18, and the display unit 20 are electrically connected to one another via a bus 22.

Meanwhile, it is sufficient that the display processing apparatus 10 includes at least the control unit 14 and the storage unit 16, and at least one of the imaging unit 12, the input unit 18, and the display unit 20 may be provided as a separate device.

The imaging unit 12 captures an image of a usage environment that is an environment of a real space in which a printed material is used. Examples of the usage environment include an office, an exhibition hall, a station, a station platform, and interiors of various buildings. A well-known imaging device may be used as the imaging unit 12. The image of the usage environment captured by the imaging unit 12 is stored (registered), as a background image serving as one type of usage environment information to be described later, in the storage unit 16.

The imaging unit 12 also captures an image of a lighting installed in the usage environment. The lighting is a light source, such as a direct lighting or an indirect lighting, in the usage environment. When the imaging unit 12 captures the lighting, an image is obtained in which the luminance is increased in an area corresponding to the lighting and an area having high reflectance for light emitted from the front side of the lighting, while the luminance is decreased in an area other than the area corresponding to the lighting and an area having low reflectance, because of an automatic exposure function of the imaging unit 12. The image of the lighting captured by the imaging unit 12 is stored (registered), as a first lighting image serving as one type of the usage environment information to be described later, in the storage unit 16.

Incidentally, the captured images (the background image and the first lighting image) obtained by the imaging unit 12 are stored in the storage unit 16 after the captured images are enlarged or reduced to a predetermined size (resolution) that is set by the control unit 14. The imaging unit 12 captures the images of the usage environment and the lighting to obtain the background image and the first lighting image upon receiving an imaging instruction through operation of the input unit 18 by a user.

The input unit 18 receives various types of operation from the user. Examples of the input unit 18 include a mouse, voice recognition using a microphone, a button, a remote control, and a keyboard.

The display unit 20 displays various images. The display unit 20 is a well-known display device, such as a liquid crystal display (LCD) or a projector, that projects an image. In the embodiment, the display unit 20 displays a preview image to be described later.

The control unit 14 is a computer including a central processing unit (CPU), a read only memory (ROM), a random access memory (RAM), and the like. The control unit 14 controls each of the units installed in the display processing apparatus 10.

The storage unit 16 is a recording medium, such as a memory or a hard disk drive (HDD), and stores therein various programs and various types of data for executing processes to be described later.

Figure 2:
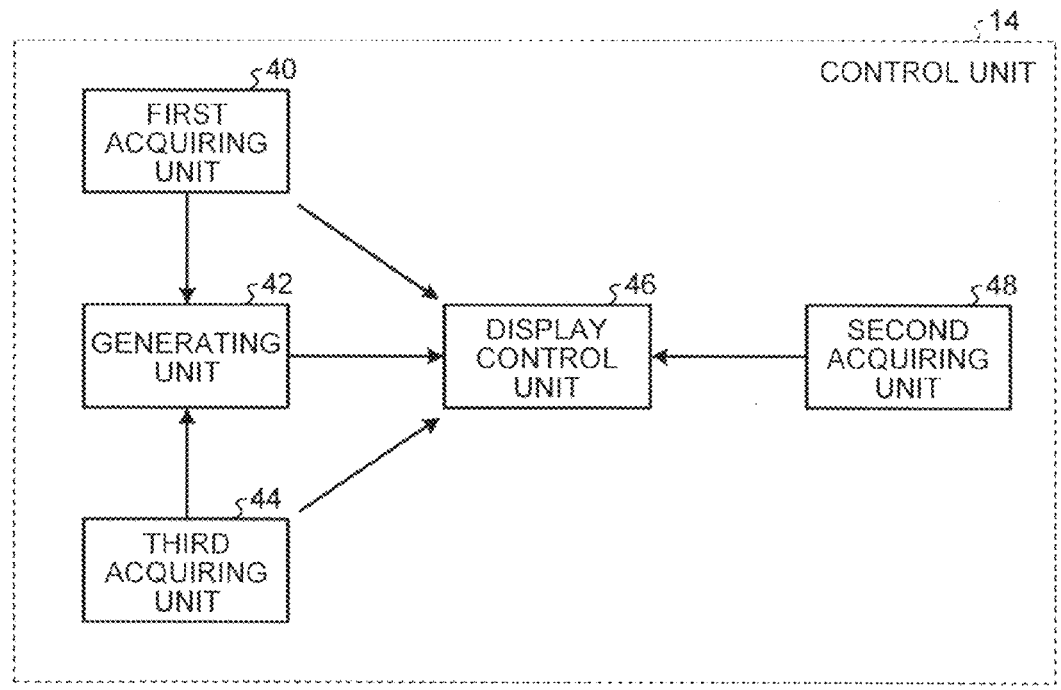
FIG. 2 is a block diagram illustrating a functional configuration of a control unit.

FIG. 2 is a block diagram illustrating a functional configuration of the control unit 14. The control unit 14 includes a first acquiring unit 40, a generating unit 42, a third acquiring unit 44, a display control unit 46, and a second acquiring unit 48.

The display control unit 46 displays the preview image for checking a print result of print data on the display unit 20. In the embodiment, the preview image is an image, in which a printed material image is superimposed on a background image (details will be described later) and which enables to check a print result of print data together with an atmosphere of a usage environment. The display control unit 46 is implemented by a three-dimensional (3D) engine, such as an open graphics library (OpenGL). The display control unit 46 will be described in detail later.

As described above, the background image is a captured image of the usage environment that is an environment of a real space in which the printed material is used. The printed material image is an image which shows how the printed material is viewed in the usage environment and in which a second lighting image, which is generated through a correction process on the first lighting image as will described later, is mapped by environment mapping onto a print-image display surface generated based on the print data. Furthermore, optical attributes in the usage environment are set in the print-image display surface.

In the embodiment, the preview image is an image obtained by projecting a three-dimensional model, in which the printed material image is placed in a three-dimensional virtual space with the background image used as a background, onto a two-dimensional plane. In the three-dimensional model, the lateral direction of a display screen of the display unit 20 serves as the x-axis, the vertical direction of the display screen serves as the y-axis, and the direction perpendicular to the display screen (a depth direction) serves as the z-axis. The background image and the printed material image are placed at different positions in the z-axis direction of the three-dimensional model such that the printed material image is located closer to the projection plane than the background image.

Furthermore, in the embodiment, the preview image is explained as an image in which the printed material image is superimposed on the background image. However, the preview image may contain other images in addition to the printed material image. Examples of the other images include, but not limited to, any image that can be displayed by being superimposed on the printed material image, in particular, a transparent image formed with a colorless developer or a surface effect image that defines a surface effect to be applied to a sheet with a colorless developer. If the preview image is formed by superimposing the other images on the printed material image, it is preferable to place the printed material image and the other images at different positions in the z-axis direction of the three-dimensional model.

The first acquiring unit 40 acquires the usage environment information. The usage environment information indicates a usage environment that is an environment of a real space in which the printed material is used. Specifically, the usage environment information contains the background image that is a captured image of the usage environment as described above, the first lighting image that is a captured image of the lighting in the usage environment as described above, and light source information. The usage environment information is stored in the storage unit 16 in accordance with registration operation performed by a user via the input unit 18.

Specifically, when an instruction to register new usage environment information is input by the user through the operation of the input unit 18, the first acquiring unit 40 acquires the background image and the first lighting image from the imaging unit 12, and stores the images in the storage unit 16 (details will be described later). Furthermore, when one of the pieces of the usage environment information stored in the storage unit 16 is selected by the user through the operation of the input unit 18, the first acquiring unit 40 acquires the selected piece of the usage environment information from the storage unit 16.

The light source information indicates an optical attribute in the usage environment. Specifically, the light source information is information for specifying a light source and reflections to render light in the preview image. More specifically, the light source information contains a light source type, intensity of specular light, intensity of diffuse light, intensity of environment light, a color temperature, and a position of the light source. In the embodiment, the light source information corresponding to the usage environment is input by the user through the operation of the input unit 18, and is stored in the storage unit 16. The first acquiring unit 40 acquires, from the storage unit 16, the light source information corresponding to the usage environment designated by the user.

The third acquiring unit 44 acquires texture information. The texture information indicates texture (visual effect) of the printed material image. In the embodiment, the third acquiring unit 44 acquires, as the texture information, a paper quality type of a printing sheet to be used to print the print data. The paper quality type of the printing sheet is input by the user through the operation of the input unit 18.

The paper quality type of the printing sheet is determined in advance for each of types whose differences in the paper quality can be recognized by a user when the user views the printed material. In the embodiment, the paper quality type include a mirror coated paper, a gloss paper, and a matte paper. However, other types may be included.

For example, the control unit 14 displays a screen for setting the paper quality type on the display unit 20 before generation of the preview image. If the user selects, through the operation of the input unit 18, a selection screen of the paper quality type displayed on the display unit 20, the control unit 14 displays, on the display unit 20, the selection screen (not illustrated) for selecting from among multiple different paper quality types that are registered in advance. When the user selects, through the operation of the input unit 18, a paper quality type of a printing sheet to be used to print the print data, the input unit 18 outputs information indicating the selected paper quality type to the control unit 14. The third acquiring unit 44 of the control unit 14 acquires, as the texture information, the information indicating the paper quality type from the input unit 18.

The third acquiring unit 44 reads lighting conversion information and reflection information associated with the acquired texture information from a texture information table stored in the storage unit 16. The third acquiring unit 44 outputs the read lighting conversion information to the generating unit 42 and outputs the reflection information to the display control unit 46.

FIG. 3 is a schematic diagram illustrating an example of a data structure of the texture information table stored in the storage unit 16. The texture information table is a table in which a texture information name and correction information are associated with each other. The correction information contains the lighting conversion information and the reflection information. The lighting conversion information is used to correct the first lighting image to generate the second lighting image to be described later. The reflection information relates to a state of reflection of the printed material according to the paper quality type of the printing sheet, and is used to render a texture of the printed material image due to a light source supported by the display control unit 46 (a light source that is virtually set by a 3D engine, such as OpenGL). The texture information name is identification information for identifying the texture information.

The lighting conversion information is used to correct the first lighting image so as to obtain a texture corresponding to the texture information (i.e., the paper quality type of the printing sheet used to print the print data). In the embodiment, the lighting conversion information contains a blur parameter and a gamma correction value.

The blur parameter is a parameter used when the generating unit 42 (to be described later) performs Gaussian filtering on the first lighting image. The gamma correction value is a correction value used when the generating unit 42 (to be described later) performs gamma correction.

The reflection information is used to render a texture of the printed material image corresponding to the texture information (i.e., the paper quality type of the printing sheet used to print the print data). The reflection information contains specular reflection, diffuse reflection, environment reflection, self-emitting light, and a specular exponent.

The specular reflection indicates reflection intensity of specular reflection. The diffuse reflection indicates reflection intensity of diffuse reflection. The environment reflection indicates reflection intensity of environment reflection.

The self-emitting light indicates intensity of light emitted by an object itself. Meanwhile, the intensity indicated by the self-emitting light is not used to display a normal preview image, but may be used, as rendition, if the paper quality of a printing sheet used to print the print data is of a type containing a large amount of fluorescent whitener.

The specular exponent is a parameter used to control attenuation of the light intensity depending on a distance, in the preview image, between the printed material image virtually placed in a three-dimensional space and the light source supported by the display control unit 46.

In the embodiment, the correction information is set in advance for each piece of the texture information, and is stored in advance in the texture information table in the storage unit 16. While details will be described later, if a new piece of the texture information is set by the user through the operation of the input unit 18, the control unit 14 updates the texture information table.

Furthermore, the reflection information in the texture information table is set based on the assumption that the light source supported by the display control unit 46 (to be described later) is used. Specifically, colors and brightness of the printed material image contained in the preview image to be displayed vary depending on the intensity of the light source supported by the display control unit 46 and the reflectance set for the print-image display surface. Therefore, by correcting the colors and the brightness of the printed material image by using the reflection information associated with the texture information, it is possible to render a texture of the printed material image according to the paper quality type of the printing sheet.

In the embodiment, one piece of the correction information is associated with one piece of the texture information. Therefore, in the embodiment, it is not necessary to prepare multiple pieces of the texture information for a single usage environment, as the texture information corresponding to the usage environment of a real space.

Furthermore, in the embodiment, when the environment mapping of the second lighting image generated by the generating unit 42 (to be described later) is performed on the print-image display surface, the reflection intensity of the specular light and the reflection intensity of the diffuse light specified by the light source information are set to values lower than pre-set values. This is done in order to prevent the reflected light from the light source supported by the display control unit from appearing intensively in the print-image display surface, in addition to the generated second lighting image.

Referring back to FIG. 2, the second acquiring unit 48 acquires print data. The print data is image data of an image to be printed on a printing sheet. The print-image display surface is generated by performing texture mapping of the image based on the print data onto a display surface set in the virtual space.

The generating unit 42 receives the first lighting image from the first acquiring unit 40. The generating unit 42 also receives, from the third acquiring unit 44, the lighting conversion information associated with the paper quality type (the texture information) of the printing sheet to be used to print the print data. The generating unit 42 corrects the acquired first lighting image by using the acquired lighting conversion information to thereby generate the second lighting image (details will be described later).

The display control unit 46 generates a preview image and displays the preview image on the display unit 20. The display control unit 46 receives the background image and the light source information from the first acquiring unit 40. The display control unit 46 also receives the second lighting image from the generating unit 42. The display control unit 46 also receives, from the third acquiring unit 44, the reflection information associated with the paper quality type (the texture information) of the printing sheet used to print the print data. The display control unit 46 also receives the print data from the second acquiring unit 48. The display control unit 46 generates a preview image, which enables to check a print result of the print data together with an atmosphere of the usage environment, based on the acquired pieces of the information and displays the preview image on the display unit 20.

The flow of a display process performed by the control unit 14 of the display processing apparatus 10 will be explained below. FIG. 4 is a flowchart illustrating the flow of the display process performed by the control unit 14.

The second acquiring unit 48 acquires print data (Step S100). Subsequently, the third acquiring unit 44 performs a texture information acquisition process (Step S102).

The third acquiring unit 44 receives, as the texture information, a paper quality type of a printing sheet to be used to print the print data input by a user through the input unit 18. If the received texture information and the correction information associated with the texture information have been stored in the texture information table in the storage unit 16, the third acquiring unit 44 reads the correction information from the storage unit 16. The third acquiring unit 44 outputs the lighting conversion information contained in the read correction information from the storage unit 16 to the generating unit 42, and outputs the reflection information contained in the read correction information from the storage unit 16 to the display control unit 46.

In contrast, if the texture information received from the input unit 18 is not stored in the texture information table in the storage unit 16, the third acquiring unit 44 performs a texture information registration process.

Specifically, the third acquiring unit 44 registers the texture information received from the input unit 18 in the texture information table, and displays a list of texture information names, which are stored in the texture information table and for which the correction information has been registered, and an instruction button for giving an instruction to input new correction information on the display unit 20. If one of the registered texture information names is selected by the user through the operation of the input unit 18, the correction information associated with the selected texture information name is stored in the texture information table in association with the newly-registered texture information name.

In contrast, if the user operates the instruction button to give an instruction to input new correction information through the operation of the input unit 18, the third acquiring unit 44 displays a screen for inputting the correction information on the display unit 20. If the user inputs the correction information through the operation of the input unit 18, the third acquiring unit 44 stores the input correction information in the texture information table in association with the newly-registered texture information name.

Subsequently, the third acquiring unit 44 outputs the lighting conversion information contained in the stored correction information to the generating unit 42, and outputs the reflection information contained in the same correction information to the display control unit 46.

Referring back to FIG. 4, the first acquiring unit 40 performs a usage environment information acquisition process (Step S104). The first acquiring unit 40 acquires, from the input unit 18, a usage environment name for identifying a usage environment that is an environment of a real space in which the printed material is used. The usage environment name is input by the user through the operation of the input unit 18. The user inputs, by operating the input unit 18, the usage environment name corresponding to the usage environment that is assumed as an environment in which the printed material is used.

Meanwhile, while an example is explained in the embodiment that the first acquiring unit 40 acquires the usage environment name, it is sufficient to acquire any identification information for identifying the usage environment in which the printed material is used, and the information to be acquired is not limited to the usage environment name.

If the acquired usage environment name has been stored in a usage environment table in the storage unit 16, the first acquiring unit 40 reads the usage environment information associated with the acquired usage environment name from the usage environment table and a light source information table stored in the storage unit 16, to thereby acquire the usage environment information.

FIG. 5 is a schematic diagram illustrating an example of a data structure of the usage environment table. As illustrated in FIG. 5, the storage unit 16 stores the usage environment name, the background image, the first lighting image, and a light source information name in the usage environment table in an associated manner. The light source information name is identification information for identifying the light source information indicating an optical attribute in the usage environment specified by the associated usage environment name. In the example in FIG. 5, the same name as the usage environment name is assigned to the light source information name; however, this is not limited thereto.

FIG. 6 is a schematic diagram illustrating an example of a data structure of the light source information table. As illustrated in FIG. 6, the light source information table is a table in which the light source information name and the light source information are associated with each other. The light source information is information on a light source in a virtual space in which the printed material image is placed, and contains a light source type, specular light, diffuse light, environment light, a color temperature, and a position of the light source.

More specifically, the light source type indicates whether a lighting image or a light source (spotlight) supported by the display control unit 46 is used as the specular reflection. In the embodiment, the light source type "1" indicates that the generated second lighting image is used as the specular reflection. Furthermore, the light source type "0" indicates that the light source (spotlight) supported by the display control unit 46 is used as the specular reflection. It may be possible to assign a value corresponding to the light source type in the virtual space to the light source type.

Even if the light source type is set to "1", in the embodiment, the display control unit 46 generates a preview image by using a light source virtually set by a 3D engine. Therefore, if the light source type is set to "1", corresponding specular light is generally set to "0" that indicates an absence of specular light. As the specular light, the diffuse light, the environment light, and the color temperature contained in the light source information, values with which the usage environment can be rendered are set in accordance with the usage environment. The position of the light source may be set in advance to a position right above the printed material image in the virtual space, or may be set in advance to a position where the specular light or the diffuse light can easily be produced depending on a viewpoint of an observer who views the preview image.

Furthermore, in the embodiment, while details will be described later, a user (observer) is allowed to arbitrarily set the position of the print-image display surface in the virtual space and the second lighting image to be mapped onto the print-image display surface by the environment mapping. If the user designates a position of the second lighting image, the second lighting image is disposed at the position designated by the user regardless of the position of the light source contained in the light source information. Incidentally, when the user designates the position of the second lighting image in the virtual space, a process is performed on the assumption that a vector in a direction in which the direction from the print-image display surface toward the second lighting image and the direction from the print-image display surface toward the viewpoint of the observer are equally divided serves as a normal vector of the print-image display surface.

Referring back to FIG. 4, if the usage environment name acquired from the input unit 18 has been registered in the usage environment table in the storage unit 16, the first acquiring unit 40 reads the usage environment information associated with the acquired usage environment name from the storage unit 16 to thereby acquire the usage environment information.

In contrast, if the acquired usage environment name has not been registered in the usage environment table in the storage unit 16, the first acquiring unit 40 performs a registration process as illustrated in FIG. 7, and thereafter reads the usage environment information associated with the acquired usage environment name from the storage unit 16 to acquire the usage environment information.

In the registration process, the first acquiring unit 40 acquires, from the input unit 18, a usage environment name that is not registered in the storage unit 16 (Step S200). Subsequently, the first acquiring unit 40 acquires a background image (a captured image of the usage environment) from the imaging unit 12 (Step S202). Incidentally, the first acquiring unit 40 may display a list of background images registered in the storage unit 16 on the display unit 20, and if a user selects one of the background images by operating the input unit 18, may acquire the selected background image as the background image associated with the acquired usage environment name acquired at Step S200.

Subsequently, the first acquiring unit 40 acquires a first lighting image (a captured image of the lighting installed in the usage environment) from the imaging unit 12 (Step S204). Incidentally, the first acquiring unit 40 may display a list of first lighting images registered in the storage unit 16 on the display unit 20, and if the user selects one of the first lighting images by operating the input unit 18, may acquire the selected first lighting image as the first lighting image associated with the acquired usage environment name acquired at Step S200.

Subsequently, the first acquiring unit 40 acquires the light source information from the input unit 18 (Step S206). For example, the first acquiring unit 40 displays a setting screen for inputting the light source information on the display unit 20. If the user inputs a parameter on a light source information input field displayed in the setting screen by operating the input unit 18, the light source information is input. The first acquiring unit 40 receives the light source information input via the input unit 18, to thereby acquire the light source information. Incidentally, the first acquiring unit 40 may display a list of pieces of light source information registered in the storage unit 16 on the display unit 20, and if the user selects one of the pieces of the light source information by operating the input unit 18, may acquire the selected piece of the light source information as the light source information associated with the usage environment name acquired at Step S200.

Subsequently, the first acquiring unit 40 registers the background image acquired at Step S202, the first lighting image acquired at Step S204, and the light source information name that is identification information on the light source information acquired at Step S206 in the usage environment table in association with the usage environment name acquired at Step S200, and also registers the light source information acquired at Step S206 in the light source information table in association with the light source information name (Step S208). It is sufficient to assign information that enables to identify each piece of the light source information to the light source information name. Then, the routine is finished.

Referring back to FIG. 4, the generating unit 42 performs a second lighting image generation process (details will be described later) (Step S106). Subsequently, the display control unit 46 performs a preview image display control process (details will be described later) (Step S108).

The display control unit 46 determines whether an instruction to change the texture or an instruction to change the usage environment is input through the input unit 18 (Step S110). For example, the display control unit 46 determines whether or not a paper quality type different from the previously-acquired paper quality type is received from the input unit 18 or whether or not an instruction to change the environment is received from the input unit 18, as the determination at Step S110.

If it is determined that the instruction is input at Step S110 (YES at Step S110), the process returns to Step S102. In contrast, if it is determined that the instruction is not input at Step S110 (NO at Step S110), the routine is finished.

Figure 9:
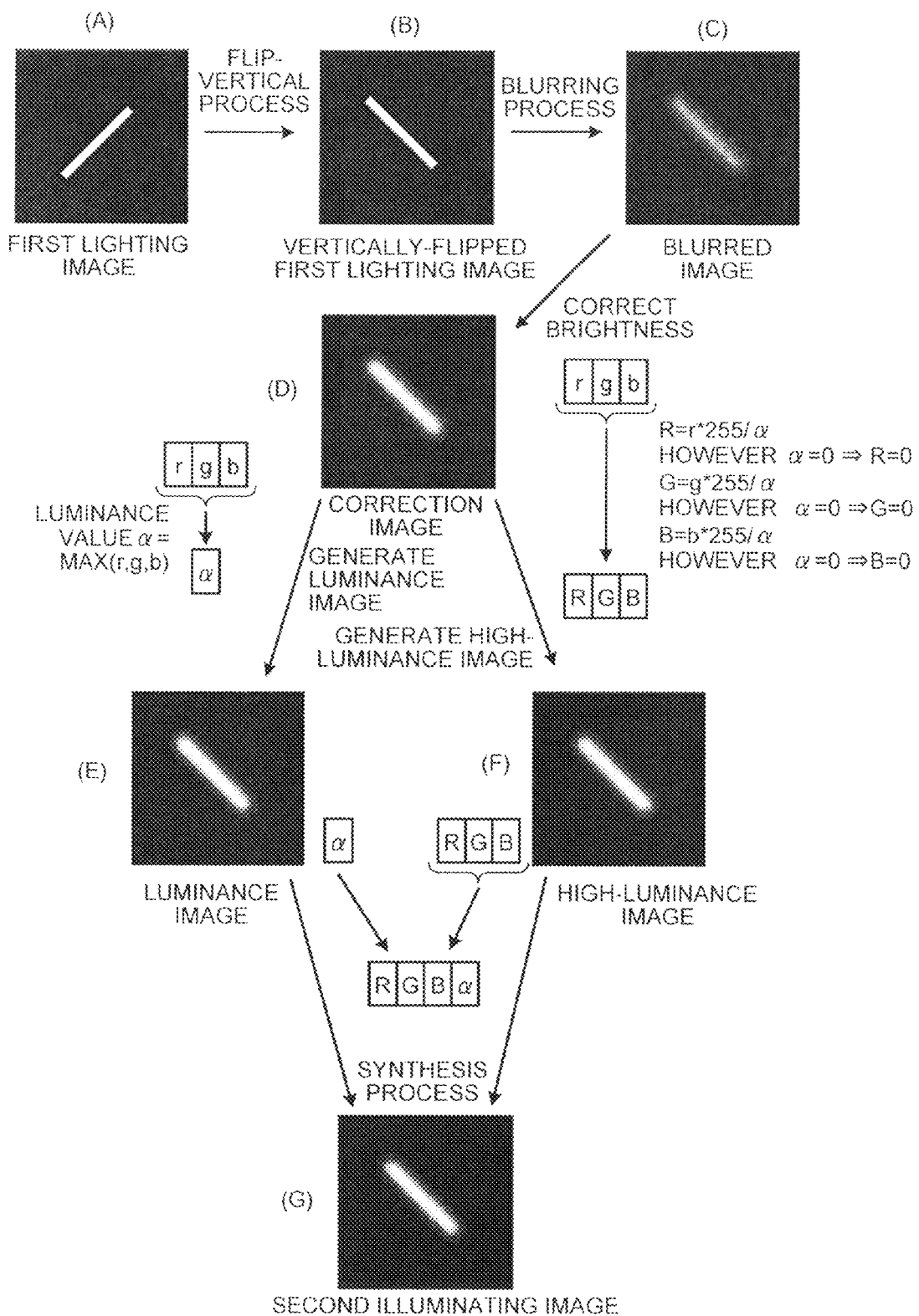
FIG. 9 is a diagram for explaining the second lighting image generation process.

The second lighting image generation process performed by the generating unit 42 (at Step S106 in FIG. 4) will be described in detail below. FIG. 8 is a flowchart illustrating the flow of the second lighting image generation process performed by the generating unit 42. FIG. 9 is a diagram for explaining the second lighting image generation process.

The generating unit 42 first performs a flip-vertical process for vertically flipping the first lighting image acquired by the first acquiring unit 40 (Step S300). As illustrated in a figure (A) in FIG. 9, the generating unit 42 performs the flip-vertical process on the first lighting image, so that a vertically-flipped first lighting image is obtained (see a figure (B) in FIG. 9). This is done in order to generate a printed material image, in which reflection of the lighting in a printed material is rendered by performing the environment mapping of the second lighting image onto the print-image display surface generated based on the print data. Specifically, the first lighting image is a captured image of the lighting and shows the shape of the lighting viewed from below in the usage environment. In contrast, light of the lighting appearing in the printed material is observed by an observer as reflection at a print surface; therefore, the shape of the light becomes the same as the vertically-flipped shape of the lighting shown in the first lighting image. To render the light of the lighting appearing in the printed material by the environment mapping of the second printing image, the second lighting image is generated by using the vertically-flipped first lighting image. Therefore, the second lighting image shows a shape close to the reflection of the light of the lighting that appears in the printed material when the printed material is actually viewed in a real usage environment.

Subsequently, the generating unit 42 performs a blurring process (Step S302). At Step S302, the generating unit 42 applies a blur parameter indicated by the lighting conversion information associated with the texture information acquired at Step S102 to the vertically-flipped first lighting image (see the figure (B) in FIG. 9), and performs Gaussian filtering. The blur parameter is data that defines a vertical size and a horizontal size of a Gaussian filter. As the sizes increase, a more blurred image than the first lighting image can be obtained (see a figure (C) in FIG. 9).

The reason why the blur parameter indicated by the lighting conversion information associated with the texture information (i.e., the paper quality type) is used to generate the blurred image is as follows. That is, the second lighting image mainly shows the specular reflection of the light of the lighting at the print surface of the printed material image, and therefore depends on the property of the printing sheet serving as a reflection object. For example, if the paper quality type of the printing sheet is a mirror coated paper, the second lighting image becomes a relatively sharp reflection image in which the original shape of the lighting is maintained. In contrast, if the paper quality type of the printing sheet is a matte paper, the second lighting image becomes an image in which a color of the lighting can be recognized but the shape of the lighting can hardly be recognized or only a faint shape can be recognized. To accurately render the reflection of the lighting according to the paper quality type of the printing sheet as described above, the blurred image is generated by using the blur parameter indicated by the lighting conversion information associated with the texture information (i.e., the paper quality type).

Subsequently, the generating unit 42 performs a brightness correction process for correcting the brightness of the blurred image (Step S304). In the process at Step S304, the generating unit 42 obtains a correction image, in which the brightness of the blurred image is corrected by using the gamma correction value indicated by the lighting conversion information associated with the texture information acquired at Step S102 (see a figure (D) in FIG. 9).

Figure 10:
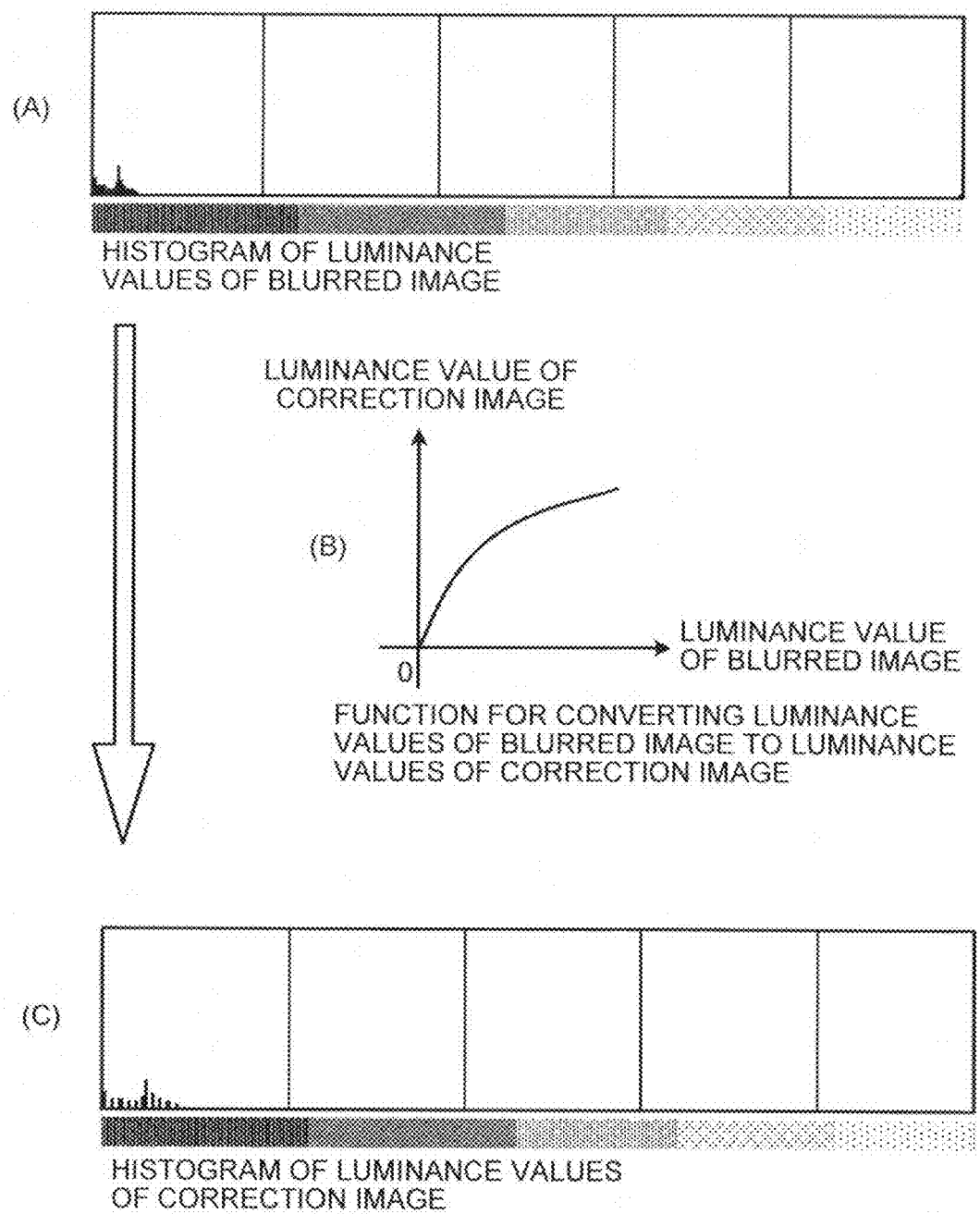
FIG. 10 is a diagram for explaining conversion from a blurred image to a correction image.

FIG. 10 is a diagram for explaining a conversion from the blurred image to the correction image. It is assumed that the histogram of luminance values of the blurred image is as illustrated in a figure (A) in FIG. 10. In this case, the luminance values of the blurred image are corrected by using a gamma correction value (a figure (B) in FIG. 10) that is a function for converting the luminance values of the blurred image to the luminance values of the correction image, so that the correction image with the histogram of luminance values as illustrated in a figure (C) in FIG. 10 is obtained.

Referring back to FIG. 8, the generating unit 42 performs a high-luminance image generation process (Step S306). A high-luminance image is an image in which the luminance is increased by multiplying a pixel value of a color at each of the pixels of the correction image by a constant value (see a figure (F) in FIG. 9). The pixel value of each of the pixels of the high-luminance image is represented by RGB values. The generating unit 42 calculates the RGB values by Equation (1) below.

Pixel value (R,G,B) of high-luminance image=(r×255/α, g×255/α, b×255/α) (1)

In Equation (1), α represents a luminance value (an alpha value or an alpha channel). Furthermore, in Equation (1), (r, g, b) represents a color value (RGB color value) of each of the pixels of the correction image. If α="0", the pixel value is set to "0".

Subsequently, the generating unit 42 performs a luminance image generation process (Step S308). In the embodiment, the display control unit 46 renders the reflection of the lighting in the printed material by using the second lighting image generated by the generating unit 42. In this case, the display control unit 46 renders the reflection of the lighting by intensifying the reflection in a brighter portion while reducing the reflection in a darker portion. Therefore, the generating unit 42 calculates the luminance values of the correction image so that less reflection is rendered in a darker portion. The image with the luminance values calculated for the respective pixels of the correction image serves as the luminance image (see a figure (E) in FIG. 9).

The generating unit 42 generates a luminance image based on the pixel value of each of the pixels of the correction image. Specifically, assuming that the pixel value of each of the pixels of the correction image is represented by r, g, and b, the generating unit 42 calculates a luminance value (alpha value) α corresponding to the pixel value of r, g, and b according to Equation (2) below.

α={maximum of r, g, and b} (2)

The generating unit 42 generates, as the luminance image, an image with the luminance values calculated by Equation (2) for the respective pixels of the correction image (see the figure (E) in FIG. 9).

Referring back to FIG. 8, the generating unit 42 performs a synthesis process (Step S310), and the routine is finished. The synthesis process is a process for synthesizing the pixel values of the pixels of the high-luminance image generated at Step S306 and the luminance values (alpha value) of the pixels of the luminance image generated at Step S308, for each of the pixels. The generating unit 42 generates the second lighting image through the synthesis process (see a figure (G) in FIG. 9).

Figure 11:
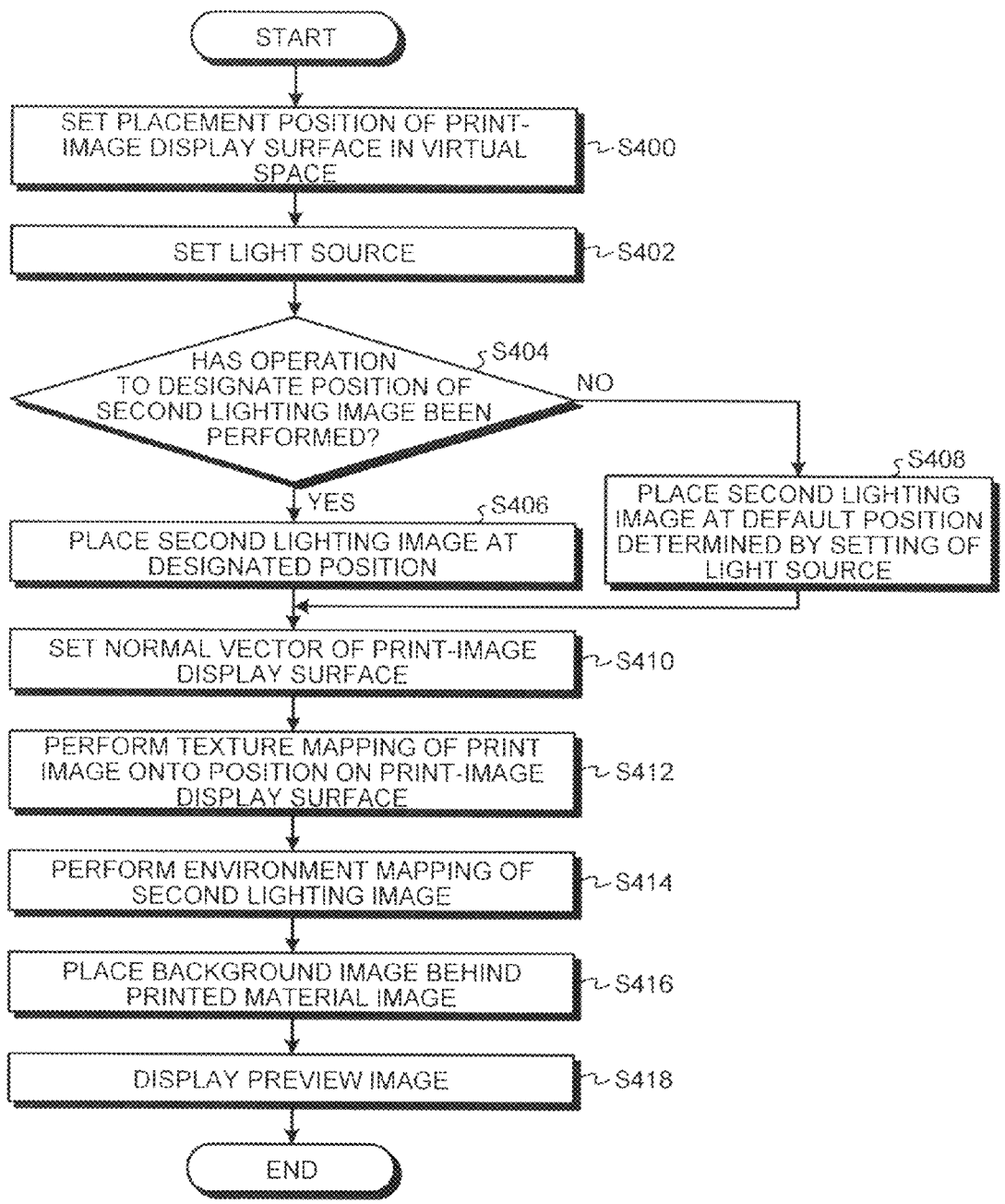
FIG. 11 is a flowchart illustrating the flow of a display control process.

A preview image display process (Step S108 in FIG. 4) performed by the display control unit 46 will be explained below. FIG. 11 is a flowchart illustrating the flow of the display control process performed by the display control unit 46.

The display control unit 46 sets a placement position of the print-image display surface in the virtual space according to user's operation of the input unit 18 (Step S400). Specifically, the display control unit 46 receives, from the user, designation of a position at which the printed material is placed in the usage environment, and sets the placement position of the print-image display surface in the virtual space so that the printed material image can be placed at the designated position. For example, the display control unit 46 displays the background image on the display unit 20, and receives user's operation to designate a position at which the printed material is placed on the background image.

Figure 12:
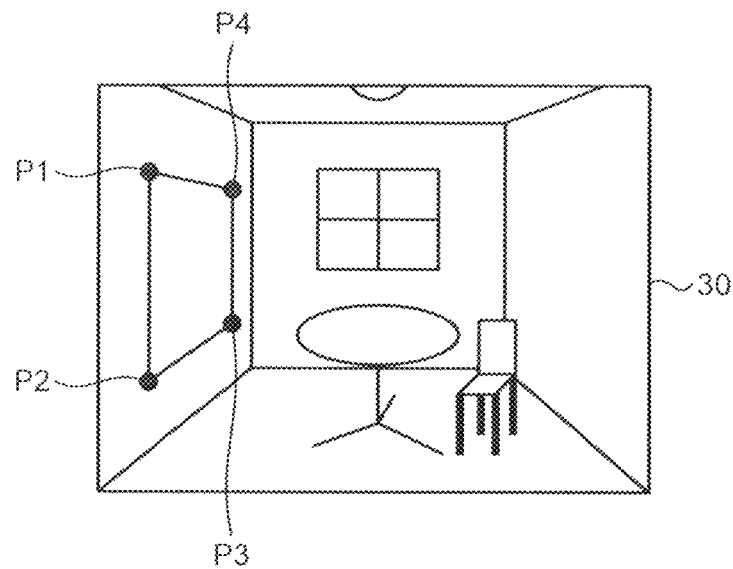
FIG. 12 is a schematic diagram illustrating a situation in which a placement position of a printed material is designated in a background image.

FIG. 12 is a schematic diagram illustrating a situation in which the placement position of the printed material on a background image 30 is designated. The user designates four points P1 to P4 indicating four vertices of the position where the printed material is placed by using the input unit 18 while viewing the background image 30 displayed on the display unit 20. A region enclosed by the four points P1 to P4 on the background image 30 designated by the user is used as the position at which the print-image display surface is placed in the three-dimensional virtual space. Because the background image 30 is a two-dimensional plane, the region enclosed by the four points P1 to P4 illustrated in FIG. 12 becomes a trapezoid shape. However, because a real printed material has a rectangular shape, the coordinates of the respective four points P1 to P4 in the three-dimensional virtual space are calculated so that the region enclosed by the four points P1 to P4 becomes a rectangular shape. In this manner, the position at which print-image display surface is placed in the virtual space is set.

In the embodiment, as described above, a rectangular region in the virtual space is calculated based on the position on the background image 30 designated by the user, and the region is determined as the position at which the print-image display surface is placed in the virtual space. Therefore, it is possible to generate a preview image according to an actual way to use the printed material by the user (for example, mounting on a wall or hanging from a ceiling).

Subsequently, the display control unit 46 sets a light source (Step S402). At Step S402, the display control unit 46 sets the optical attribute specified by the light source information associated with the usage environment acquired from the first acquiring unit 40, as an attribute of a light source that is virtually placed in the virtual space to render light.

The display control unit 46 determines whether the user has performed the operation to designate the position of the second lighting image to be mapped to the print-image display surface by the environment mapping (Step S404). If the user has performed the operation to designate the position of the second lighting image (YES at Step S404), the second lighting image is placed at the position corresponding to the user's operation (Step S406). Specifically, if the user has performed the operation to designate the position of the lighting in the usage environment, the display control unit 46 receives the operation and place the second lighting image at the designated position.

Figure 13:
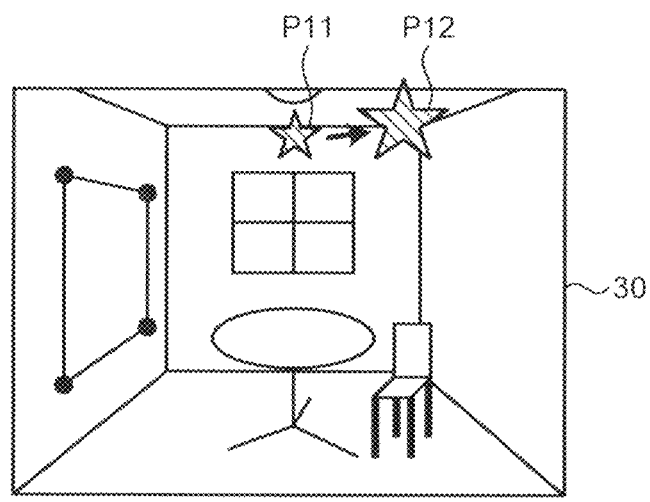
FIG. 13 is a diagram illustrating a situation in which the position of a second lighting image is changed from an initial position to a position according to user's operation.

FIG. 13 is a diagram illustrating a situation in which the position of the second lighting image is changed from an initial position P11 to a position P12 according to user's operation. The user is allowed to perform operation to move the position of the second lighting image from the initial position P1 by using the input unit 18 while viewing the background image 30 displayed on the display unit 20. The initial position P11 is a position of the light source that is determined by the setting of the light source at Step S402, that is, a default position of the light source indicated by the light source information associated with the usage environment. If a keyboard is used as the input unit 18, the user cam move the position of the second lighting image in the virtual space from the initial position P11 along the X-axis of the virtual space by operating, for example, the right and left arrow keys of the keyboard. Furthermore, the user cam move the position of the second lighting image in the virtual space from the initial position P11 along the Y-axis of the virtual space by operating, for example, the up and down arrow keys of the keyboard. Moreover, the user can move the position of the second lighting image in the virtual space from the initial position P11 along the Z-axis of the virtual space by operating, for example, a "U" key or a "D" key of the keyboard.

In the embodiment, as described above, the position of the second lighting image can arbitrarily be set according to the user's operation. Therefore, it is possible to generate the preview image in which the real usage environment of the printed material is faithfully reproduced.

In contrast, if the user has not performed the operation to designate the position of the second lighting image (NO at Step S404), the display control unit 46 places the second lighting image at the default position of the light source determined by the setting of the light source at Step S402 (the initial position P11 in FIG. 13) (Step S408).

Subsequently, the display control unit 46 sets a normal vector of the print-image display surface placed in the virtual space (Step S410). In the embodiment, the normal vector of the print-image display surface is not always set in a direction perpendicular to the print-image display surface but is set according to a relationship of the position of the print-image display surface determined at Step S400, the position of the second lighting image determined at Step S406 or Step S408, and the position of the viewpoint.

A result of the environment mapping of the second lighting image onto the print-image display surface varies depending on the direction of the normal vector of the print-image display surface with respect to the second lighting image. To perform the environment mapping of the second lighting image so that the reflection of the lighting in the print-image display surface can be observed from the position of the viewpoint, it is sufficient to employ, as the normal vector of the print-image display surface, a vector that equally divides the direction from the print-image display surface toward the second lighting image and the direction from the print-image display surface toward the position of the viewpoint. In other words, to set the second lighting image at an arbitrary position, the normal vector of the print-image display surface is set as a vector in a direction in which the direction toward the set second lighting image and the direction toward the position of the viewpoint are equally divided.

Subsequently, the display control unit 46 performs the texture mapping of the printing image based on the print data onto the position of the print-image display surface set at Step S400 in the virtual space (Step S412).

The display control unit 46 then performs the environment mapping of the second lighting image generated by the generating unit 42 onto the print-image display surface to which the printing image is mapped by the texture mapping (Step S414). In this case, the environment mapping is performed on the print-image display surface based on the assumption that the second lighting image is placed at the position determined at Step S406 or Step S408. Furthermore, by setting the light source at Step S402, the optical attribute specified by the light source information associated with the usage environment is set in the print-image display surface to which the second lighting image is mapped by the environment mapping. Therefore, it is possible to generate the printed material image showing the printed material being used in the usage environment.

Incidentally, when performing the environment mapping of the second lighting image onto the print-image display surface, the display control unit 46 performs alpha blending of the print-image display surface and the second lighting image. Therefore, the pixel value of each of the pixels of the print-image display surface become a value combined at the ratio of alpha value/255:(1–alpha value/255). Consequently, the pixel value obtained by Equation (3) below is used as the pixel value of each of the pixels of the second lighting image when the printed material image is generated.

$$\alpha/255 \times (R,G,B) = \alpha/255 \times (r \times 255/\alpha, g \times 255/\alpha, b \times 255/\alpha) = (r,g,b) \quad (3)$$

By causing the display control unit 46 to generate the printed material image in which the second lighting image is mapped to the print-image display surface by the environment mapping by using Equation (3), the brightness and the color of the lighting installed in the real space can be reflected in the printed material image. In other words, it becomes possible to perform the environment mapping such that a black region in the second lighting image does not appear in the printed material image.

Furthermore, if a grayscale image is used as the first lighting image, the image processing can further be simplified. Specifically, the high-luminance image becomes an all-white image, and the luminance image becomes a grayscale image. In the first lighting image, the lighting and a portion where the lighting is intensively reflected clearly appear in the printing sheet, while other portions are extremely dark and less likely to appear in the printing sheet. In an image obtained by capturing the lighting in the usage environment while activating the automatic exposure function of the imaging unit 12, the lighting and the portion where the lighting is intensively reflected become bright, and other portions become extremely dark. Therefore, in the embodiment, it is preferable to use, as the first lighting image, an image of the lighting captured with the activated automatic exposure function of the imaging unit 12.

Subsequently, the display control unit 46 places the background image acquired by the first acquiring unit 40 as a background behind the printed material image in accordance with the display area of the virtual space (Step S416). Then, the display control unit 46 projects a three-dimensional model, which is generated through the above process and in which the printed material image is placed in the three-dimensional virtual space with the background image used as the background, on the two-dimensional plane, and displays the image projected on the two-dimensional plane as the preview image on the display unit 20 (Step S418). Then, the routine is finished.

Figure 14:
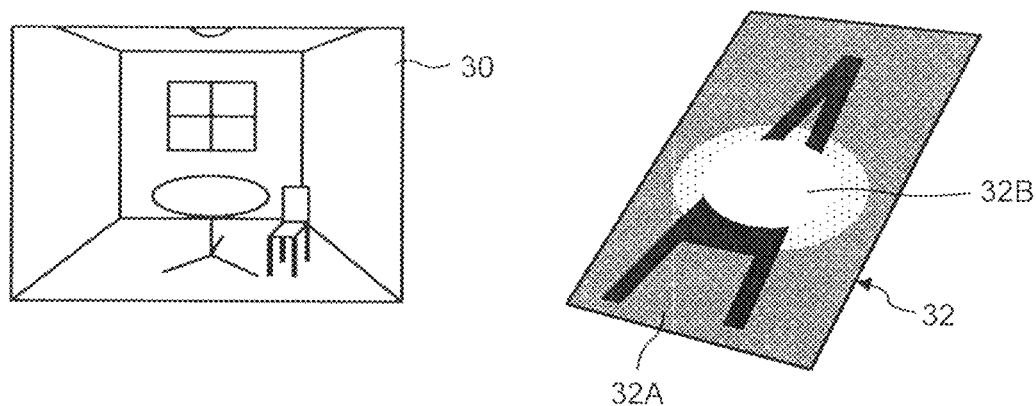
FIG. 14 is a schematic diagram illustrating examples of a background image and a printed material image that form a preview image.

FIG. 14 is a schematic diagram illustrating an example of the background image and the printed material image contained in the preview image. The display control unit 46 generates, as the preview image, an image obtained by projecting the three-dimensional model, in which a printed material image 32 is placed in the three-dimensional virtual space with the background image 30 as illustrated in FIG. 14 used as a background, on the two-dimensional plane. The printed material image 32 is an image, in which a second lighting image 32B is mapped by the environment mapping onto a print-image display surface 32A to which the printing image based on the print data is mapped by the texture mapping. Furthermore, in the printed material image 32, the optical attribute specified by the light source information associated with the usage environment is set. Incidentally, the optical attribute specified by the light source information associated with the usage environment is an attribute specified by, for example, the intensity of the light source in a 3D engine, the reflectance of the print-image display surface 32A (the reflectance of the printing sheet), and the normal vector.

Figure 15:
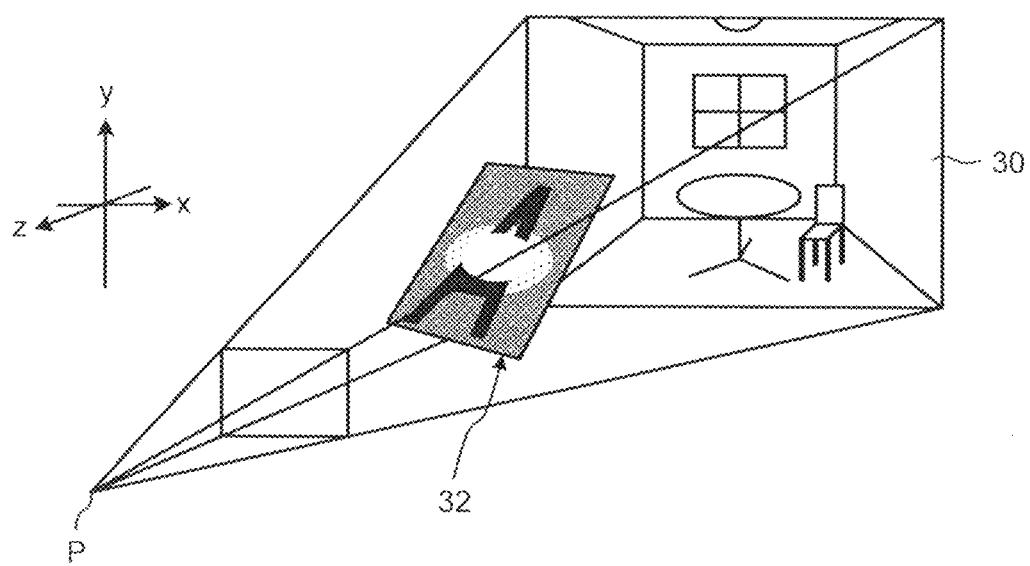
FIG. 15 is a schematic diagram illustrating an example of the preview image.

FIG. 15 is a schematic diagram illustrating an example of the preview image. By causing the display control unit 46 to display the preview image on the display unit 20, it is possible to provide the preview image as illustrated in FIG. 15 for example. Specifically, a preview image is displayed on the display unit 20 such that when viewed from the position of a viewpoint P, the printed material image 32, in which the light source information associated with the usage environment used for the printed material is set and in which the second lighting image is mapped by the environment mapping, is placed, and the background image 30 that is a captured image of the usage environment is placed behind the printed material image 32 in the virtual space. The user can check a print result of the print data together with the atmosphere of the usage environment by referring to the preview image.

Furthermore, if the user performs operation to designate the placement position of the printed material on the background image 30 by using the input unit 18 as in the example illustrated in FIG. 12, a preview image is displayed on the display unit 20 such that the printed material image 32 appears as if the printed material image 32 is mounted on a wall in the background image 30. In this case, if the user appropriately adjusts the position of the second lighting image by using the input unit 18, it becomes possible to display a preview image such that the reflection of the lighting in the usage environment appears in the printed material image 32, regardless of the position of the printed material image 32.

Incidentally, if the user performs operation to rotate the printed material image 32 by using the input unit 18 while the preview image is being displayed on the display unit 20, the display control unit 46 may rotate the printed material image 32 contained in the preview image according to the user's operation. In this case, the position of the print-image display surface in the virtual space is re-calculated based on the amount of rotation of the printed material image 32 according to the user's operation, and the printing image of the print data is mapped to the re-calculated print-image display surface by the texture mapping. Furthermore, the normal vector of the print-image display surface is re-calculated based on the amount of rotation of the printed material image 32 according to the user's operation, and the second lighting image is mapped to the print-image display surface by the environment mapping according to the re-calculated normal vector, so that the printed material image 32 is updated. Therefore, it becomes possible to check the view of the printed material image 32 from the position of the viewpoint P while changing the way of view according to the user's operation. Consequently, it becomes possible to more effectively display the preview image.

As described above, in the display processing apparatus 10 according to the embodiment, the display control unit 46 displays a preview image that is a projection image of a three-dimensional model, in which the printed material image is placed in the three-dimensional virtual space with the background image used as a background, on the two-dimensional plane. The background image is a captured image of the usage environment that is an environment of a real space in which the printed material is used. The printed material image is an image, in which the image of the lighting in the usage environment is mapped by the environment mapping to the print-image display surface to which the printing image of the print data is mapped by the texture mapping, and in which the optical attribute specified by the light source information associated with the usage environment is set. Therefore, the display processing apparatus 10 according to the embodiment can provide a preview image that enables to check a print image of the print data together with the atmosphere of the usage environment.

Furthermore, the display processing apparatus 10 according to the embodiment generates the second lighting image by correcting the first lighting image, which is a captured image of the lighting in the usage environment obtained by the imaging unit 12, based on a correction value associated with the texture information that is the paper quality type of the printing sheet used to print the print data. The display processing apparatus 10 then generates the printed material image by performing the environment mapping of the second lighting image onto the print-image display surface. Therefore, the display processing apparatus 10 according to the embodiment can easily provide a preview image in which the texture of the printed material is accurately rendered in accordance with the paper quality type of the printing sheet.

Moreover, the display processing apparatus 10 according to the embodiment may acquire the background image, the first lighting image, and the light source information by the user's operation of the input unit 18, or may generate new usage environment information by using the background image, the first lighting image, the light source information, and the like that are already stored in the storage unit 16. Therefore, it becomes possible to easily set new usage environment information.

Furthermore, the display processing apparatus 10 according to the embodiment can arbitrarily designate the position of the printed material image in the preview image according to the user's operation. Therefore, it is possible to display a preview image according to an actual way to use the printed material, for example, mounting of the printed material on a wall or hanging of the printed material from a ceiling. Consequently, the user can check the print result of the print data with more accuracy.

Moreover, the display processing apparatus 10 according to the embodiment can arbitrarily set the position of the second lighting image according to user's operation. Therefore, it becomes possible to display a preview image in which the real usage environment of the printed material is more faithfully reproduced. Consequently, the user can check the print result of the print data with more accuracy.

First Modification

In the above embodiment, an example is explained that the placement position of the print-image display surface in the virtual space and the position of the second lighting image that is mapped to the print-image display surface by the environment mapping are set according to the user's operation of the input unit 18. However, the placement position of the print-image display surface in the virtual space or the position of the second lighting image may be set to predetermined positions instead of being set by the user's operation. In this case, the placement position of the print-image display surface and the normal vector are stored in the storage unit 16, and the display control unit 46 appropriately reads the information from the storage unit 16. Furthermore, the position of the second lighting image may be set to the position of the light source contained in the light source information.

Second Modification

In the embodiment, an example is explained that the display processing apparatus 10 includes the imaging unit 12, and acquires the first lighting image and the background image from the imaging unit 12. However, the display processing apparatus 10 may not include the imaging unit 12.

Figure 16:
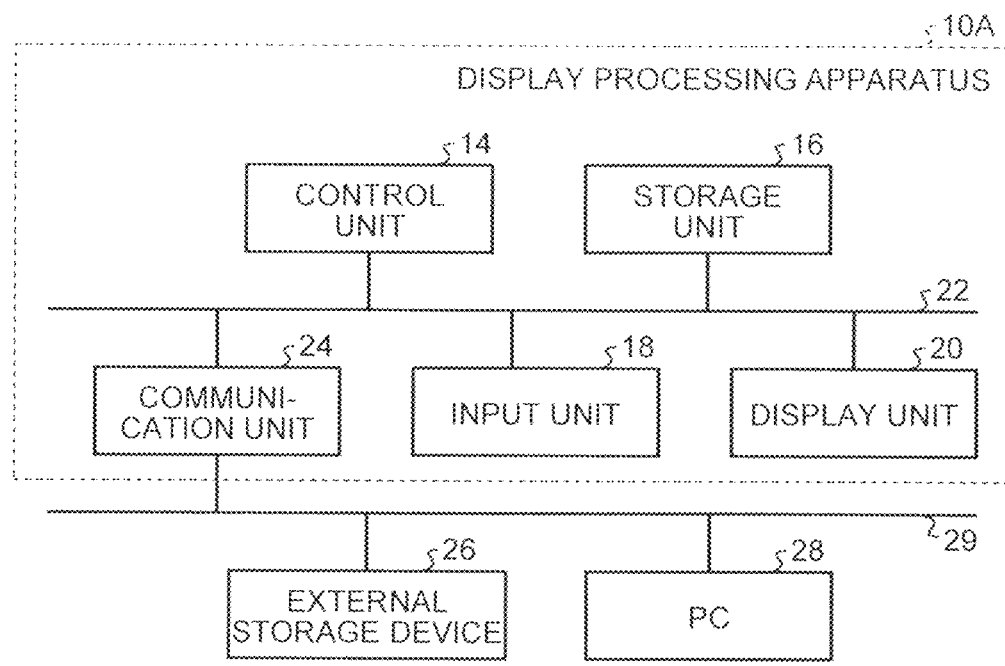
FIG. 16 is a schematic diagram illustrating an example of a display processing apparatus that does not include an imaging unit.

FIG. 16 is a schematic diagram illustrating an example of a display processing apparatus 10A that does not include the imaging unit 12. As illustrated in FIG. 16, the display processing apparatus 10A includes the control unit 14, the storage unit 16, the input unit 18, the display unit 20, and a communication unit 24. The control unit 14, the storage unit 16, the input unit 18, the display unit 20, and the communication unit 24 are electrically connected to one another via the bus 22. The storage unit 16, the input unit 18, and the display unit 20 are the same as those of the above embodiment.

The communication unit 24 is a communication interface that transmits and receives signals to and from an external storage device 26 via a network 29. The display processing apparatus 10A, the external storage device 26, and a personal computer (PC) 28 are connected to the network 29.

The external storage device 26 stores therein, in advance, background images and first lighting images corresponding to various usage environments that may be used as a usage environment for a printed material. The display processing apparatus 10A acquires a background image and a first lighting image from the external storage device 26 via the communication unit 24 and the network 29. If the PC 28 stores therein background images and first lighting images, the display processing apparatus 10A may acquire a background image and a first lighting image from the PC 28 via the communication unit 24 and the network 29. In this way, the display processing apparatus 10A can display the same preview image as that of the above embodiment by acquiring the background image and the first lighting image from an external apparatus, such as the external storage device 26 or the PC 28, even without the imaging unit 12.

Third Modification

A part of the processes performed by the display processing apparatus 10 of the above embodiment may be performed by at least one of a device in a cloud connected to the display processing apparatus 10.

Figure 17:
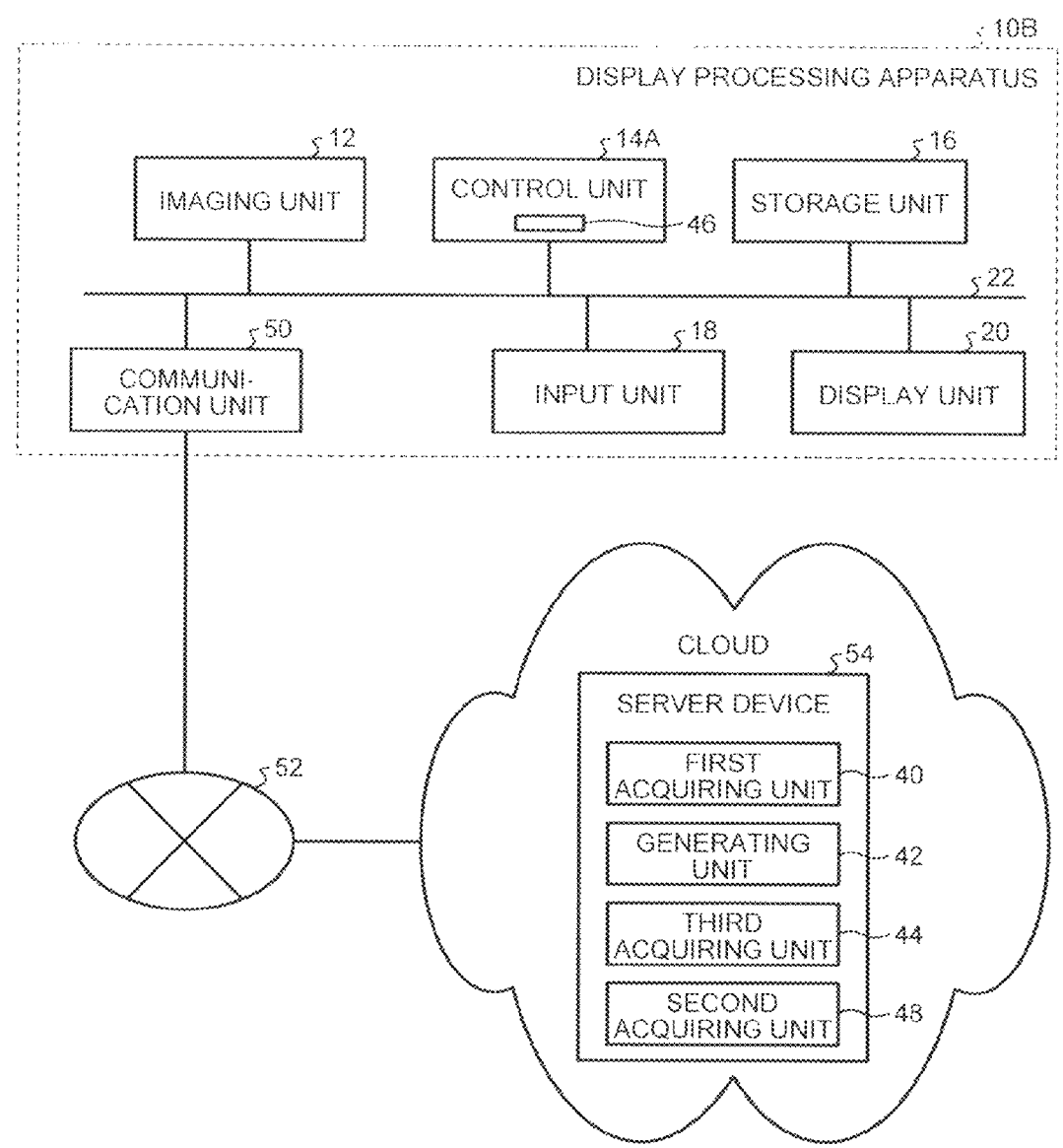
FIG. 17 is a schematic diagram illustrating an example of a display processing system.

FIG. 17 is a schematic diagram illustrating an example of a display processing system using a server device in the cloud. As illustrated in FIG. 17, the display processing system includes a display processing apparatus 10B and a server device 54 that are connected to each other via a network 52.

The display processing apparatus 10B includes the imaging unit 12, a control unit 14A, the storage unit 16, the input unit 18, the display unit 20, and a communication unit 50. The imaging unit 12, the control unit 14A, the storage unit 16, the input unit 18, the display unit 20, and the communication unit 50 are connected to one another via the bus 22. The imaging unit 12, the storage unit 16, the input unit 18, and the display unit 20 are the same as those of the above embodiment.

The control unit 14A includes a display control unit 46. The control unit 14A has the same configuration as that of the above embodiment except that the control unit 14A does not include the first acquiring unit 40, the generating unit 42, the third acquiring unit 44, and the second acquiring unit 48.

The server device 54 is a server device in the cloud. The server device 54 includes the first acquiring unit 40, the generating unit 42, the third acquiring unit 44, and the second acquiring unit 48 explained above. The functions of the units are the same as those of the above embodiment.

The third modification differs from the above embodiment in that the processes by the first acquiring unit 40, the generating unit 42, the third acquiring unit 44, and the second acquiring unit 48 are performed in the server device 54, and the acquired various types of information are transmitted from the server device 54 to the display processing apparatus 10B. Furthermore, the display control unit 46 of the control unit 14A of the display processing apparatus 10B generates and displays a preview image based on the various types of information acquired from the server device 54.

The processes performed by the server device 54 are not limited to the example as described above. The server device 54 may perform a part of the processes performed by the image forming system according to the embodiment.

Furthermore, the image forming system may include two or more server devices. In this case, parts of the processes performed by the image forming system of the embodiment are distributed to each of the server devices. Moreover, the processes distributed to each of the serves may be set arbitrarily.

A hardware configuration of the display processing apparatus 10, the display processing apparatus 10A, the display processing apparatus 10B, and the server device 54 will be explained below.

Figure 18:
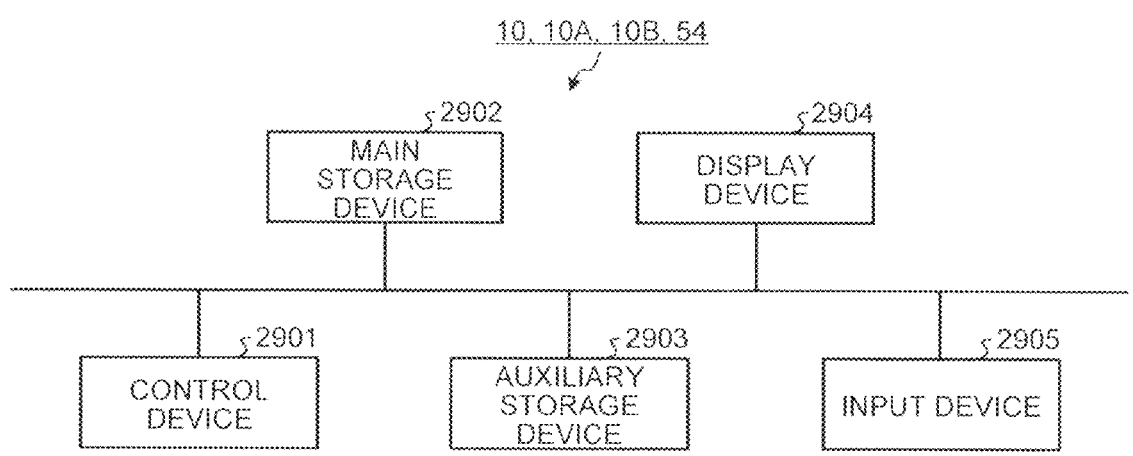
FIG. 18 is a hardware configuration diagram of the display processing apparatus and a server device.

FIG. 18 is a hardware configuration diagram of the display processing apparatus 10, the display processing apparatus 10A, the display processing apparatus 10B, and the server device 54. Each of the display processing apparatus 10, the display processing apparatus 10A, the display processing apparatus 10B, and the server device 54 mainly includes a control device 2901, such as a CPU, for controlling the entire apparatus, a main storage device 2902, such as a ROM or a RAM, for storing various types of data and programs, an auxiliary storage device 2903, such as an HDD, for storing various types of data and programs, an input device 2905, such as a keyboard or a mouse, and a display device 2904, such as a display, and has a hardware configuration using a normal computer. Each of the display processing apparatus 10, the display processing apparatus 10A, the display processing apparatus 10B, and the server device 54 executes predetermined programs to implement functional components of the control unit 14, the control unit 14A, and the server device 54 (i.e., the first acquiring unit 40, the generating unit 42, the third acquiring unit 44, the display control unit 46, and the second acquiring unit 48).

The programs executed by the display processing apparatus 10, the display processing apparatus 10A, the display processing apparatus 10B, and the server device 54 of the embodiment are stored in a computer-readable recording medium, such as a compact disc-ROM (CD-ROM), a flexible disk (FD), a compact disc-recordable (CD-R), or a digital versatile disk (DVD), in a computer-installable or a computer-executable file format, and provided as a computer program product.

Furthermore, the programs executed by the display processing apparatus 10, the display processing apparatus 10A, the display processing apparatus 10B, and the server device 54 of the embodiment may be stored in a computer connected to a network, such as the Internet, and may be provided by being downloaded. Moreover, the programs executed by the display processing apparatus 10, the display processing apparatus 10A, the display processing apparatus 10B, and the server device 54 of the embodiment may be provided or distributed via a network, such as the Internet.

Furthermore, the programs executed by the display processing apparatus 10, the display processing apparatus 10A, the display processing apparatus 10B, and the server device 54 of the embodiment may be provided by being stored in a ROM or the like.

The programs executed by the display processing apparatus 10, the display processing apparatus 10A, the display processing apparatus 10B, and the server device 54 of the embodiment has a module structure including the above units (the first acquiring unit 40, the generating unit 42, the third acquiring unit 44, the display control unit 46, and the second acquiring unit 48). As actual hardware, the control device 2901 (processor) reads the programs from the recording medium and executes the programs, so that each of the units are loaded and generated on the main storage device 2902.

According to an embodiment of the present invention, it is possible to provide a preview image that enables to check a print result of print data together with an atmosphere of a usage environment.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus, comprising:
a memory that stores, for each of a plurality of paper quality types, corresponding correction information, the correction information including light conversion information and reflection information, the reflection information being used to correct color and brightness of a print image; and
processing circuitry configured to
acquire a background image, which is an image of a usage environment in which a printed material is used, a lighting image, which is an image of a lighting installed in the usage environment, and light source information indicating an optical attribute in the usage environment;
acquire print data;
acquire a selection of a paper quality type of a printing sheet used to print the print data;
obtain, by accessing the memory using the selected paper quality type, correction information corresponding to the selected paper quality type; and
display a preview image on a display, the preview image being an image in which a printed material image is superimposed on the background image, and the printed material image being an image in which the lighting image is mapped by environment mapping onto a print-image display surface generated based on the print data and in which the optical attribute specified by the light source information is set,
wherein the processing circuitry corrects the lighting image using the obtained correction information, before mapping the lighting image.

2. The display processing apparatus according to claim 1, wherein the processing circuitry is further configured to receive a designated position at which the printed material image is placed on the background image, and display a preview image in which the printed material image is placed at the designated position.

3. The display processing apparatus according to claim 1, wherein the processing circuitry is further configured to receive a designated position of the lighting image, and perform environment mapping of the lighting image at the designated position on the print-image display surface.

4. The display processing apparatus according to claim 1, wherein the processing circuitry is further configured to:
generate a second lighting image by correcting a first lighting image, which is the lighting image acquired by the processing circuitry, based on the obtained correction information, and
use the second lighting image as the lighting image to be mapped onto the print-image display surface by the environment mapping.

5. The display processing apparatus according to claim 4, wherein the processing circuitry is configured to generate a blurred image by performing a blurring process on a flipped image that is a vertically-flipped first lighting image, generate a correction image by correcting brightness of the blurred image, generate a first luminance image and a second luminance image based on the correction image, and generate the second lighting image by synthesizing the first luminance image and the second luminance image.

6. The display processing apparatus according to claim 1, further comprising a camera configured to capture the background image and the lighting image, wherein
the processing circuitry is configured to acquire the background image captured by the camera and the lighting image captured by the camera.

7. The display processing apparatus according to claim 1, wherein the processing circuitry is further configured to display, on the display, a preview image that is a projection image of a three-dimensional model, in which the printed material image is placed in a three-dimensional virtual space with the background image used as a background, on a two-dimensional plane.

8. The display processing apparatus according to claim 1, wherein the processing circuitry is configured to receive an amount of rotation to rotate the printed material image, and update the printed material image in the preview image according to the received amount of rotation.

9. A display processing method implemented by a display processing apparatus that includes a memory that stores, for each of a plurality of paper quality types, corresponding correction information, the correction information including light conversion information and reflection information, the reflection information being used to correct color and brightness of a print image, the display processing method comprising:
acquiring, by the display processing apparatus, a background image, which is an image of a usage environment in which a printed material is used, a lighting image, which is an image of a lighting installed in the usage environment, and light source information indicating an optical attribute in the usage environment;
acquiring, by the display processing apparatus, print data;
acquiring a selection of a paper quality type of a printing sheet used to print the print data;
obtaining, by accessing the memory using the selected paper quality type, correction information corresponding to the selected paper quality type; and
displaying, by the display processing apparatus, a preview image on a display, the preview image being an image in which a printed material image is superimposed on the background image, and the printed material image being an image in which the lighting image is mapped by environment mapping onto a print-image display surface generated based on the print data and in which the optical attribute specified by the light source information is set,
wherein the method further includes correcting the lighting image using the obtained correction information, before the lighting image is mapped.

10. A computer program product comprising a non-transitory computer-usable medium having computer-readable program codes embodied in the medium, the program codes when executed causing a computer to execute a method comprising:
acquiring a background image, which is an image of a usage environment in which a printed material is used, a lighting image, which is an image of a lighting installed in the usage environment, and light source information indicating an optical attribute in the usage environment;

acquiring print data;

acquiring a selection of a paper quality type of a printing sheet used to print the print data;

acquiring, by accessing a memory using the selected paper quality type, correction information corresponding to the selected paper quality type, wherein the memory stores, for each of a plurality of paper quality types, corresponding correction information, the correction information including light conversion information and reflection information, the reflection information being used to correct color and brightness of a print image; and displaying a preview image on a display, the preview image being an image in which a printed material image is superimposed on the background image, and the printed material image being an image in which the lighting image is mapped by environment mapping onto a print-image display surface generated based on the print data and in which the optical attribute specified by the light source information is set, wherein the method further includes correcting the lighting image using the obtained correction information, before the lighting image is mapped.

* * * * *